United States Patent
Beeson et al.

(10) Patent No.: US 7,425,118 B2
(45) Date of Patent: Sep. 16, 2008

(54) MASK FOR SHIELDING IMPELLERS AND BLISKS DURING AUTOMATED WELDING

(75) Inventors: William J. Beeson, Tempe, AZ (US); Christopher J. Horton, Auburn, NY (US); Andrew R. MacDonald, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 537 days.

(21) Appl. No.: 11/261,801

(22) Filed: Oct. 27, 2005

(65) Prior Publication Data

US 2007/0095797 A1    May 3, 2007

(51) Int. Cl.
F01D 25/00    (2006.01)

(52) U.S. Cl. .................. 416/146 R; 416/248; 29/889.1; 228/214

(58) Field of Classification Search .................... 416/62, 416/146 R, 213 R; 29/889.1
See application file for complete search history.

(56) References Cited

U.S. PATENT DOCUMENTS

| | | |
|---|---|---|
| 4,342,900 A | 8/1982 | Susei et al. |
| 4,562,334 A | 12/1985 | Brandt |
| 4,642,445 A | 2/1987 | Stol |
| 4,680,440 A | 7/1987 | Barlet |
| 4,757,933 A | 7/1988 | Hawkins et al. |
| 4,792,688 A | 12/1988 | Young |
| 5,003,150 A | 3/1991 | Stricklen |
| 5,290,989 A | 3/1994 | Zibilich et al. |
| 5,345,054 A | 9/1994 | Li |
| 5,388,753 A | 2/1995 | Bjorkman, Jr. |
| 5,393,948 A | 2/1995 | Bjorkman, Jr. |
| 5,484,973 A | 1/1996 | Gittens et al. |
| 6,530,317 B2 | 3/2003 | Gelbart |
| 6,772,933 B2 | 8/2004 | Dasbach |
| 7,247,000 B2 * | 7/2007 | Cahoon et al. .......... 416/146 R |
| 2004/0060909 A1 | 4/2004 | D'Andrea et al. |
| 2004/0079732 A1 | 4/2004 | Dasbach |

* cited by examiner

Primary Examiner—Richard Edgar
(74) Attorney, Agent, or Firm—Ingrassia, Fisher & Lorenz, P.C.

(57) ABSTRACT

A mask is provided for shielding a radially extending edge of an impeller vane during a weld repair process, where the impeller vane extends radially and axially outwardly from a shaft. The mask comprises a hub and a flange. The hub has an outer surface and an opening extending therethrough, and the opening is configured to allow the shaft to extend at least partially therethrough. The flange extends radially outwardly from the hub outer surface and is configured to shroud substantially all of the impeller vane radially extending edge.

17 Claims, 5 Drawing Sheets

MASK FOR SHIELDING IMPELLERS AND BLISKS DURING AUTOMATED WELDING

TECHNICAL FIELD

The present invention relates to gas turbine engine repair tools, and, more particularly, to a mask for shielding a portion of an impeller vane during a weld repair process.

BACKGROUND

A gas turbine engine may be used to power various types of vehicles and systems. A particular type of gas turbine engine that may be used to power an aircraft is a turbofan gas turbine engine. A turbofan gas turbine engine may include, for example, a fan section, a compressor section, a combustor section, a turbine section, and an exhaust section. The fan section is positioned at the front of the engine, and includes a fan that induces air from the surrounding environment into the engine and accelerates a fraction of this air toward the compressor section. The remaining fraction of induced air is accelerated into and through a bypass plenum, and out the exhaust section.

The compressor section is configured to raise the pressure of the air to a relatively high level. In particular, the compressor section includes an impeller that has a plurality of vanes extending therefrom that accelerate and compress the air. The compressed air then exits the compressor section, and is energized by the combustor section and flowed into the turbine section to cause rotationally mounted turbine vanes to rotate and generate energy.

Over time, certain components of the engine may become worn and may need to be replaced or repaired. For example, impeller vanes may become deformed or damaged due to prolonged exposure to high temperature air and continuous bombardment by particles during engine operation. Impeller vane repairs often employ welding processes, such as, for example, laser welding, tungsten inert gas welding, or plasma arc welding, where a power source is used to melt a filler material, and a sufficient amount of the melted material is deposited onto a desired area of the impeller. After the material cools and hardens, the area is machined into a desired configuration.

When the filler material is in a molten state, it is preferably isolated from contact with oxygen. Oxygen may oxidize or contaminate the filler material and cause it to become relatively brittle or weak. To prevent such contamination, the impeller is typically bathed in a noble gas, such as argon. The gas, which is typically heavier than air, is generally supplied through a weld head, spread through a metal screen either coupled or adjacent thereto, and poured directly onto the impeller.

Although the above-mentioned technique for bathing the impeller is adequate, it suffers from certain drawbacks. Specifically, because the impeller vanes and shaft do not form enclosed cavities, the gas continuously spills off of the impeller and thus, needs to be continually supplied. As a result, a large amount of gas is used. Additionally, the gas may not sufficiently bathe certain portions of the impeller, and, consequently, the impeller may not be entirely covered in the gas. Thus, the likelihood of the filler material becoming oxidized increases.

Hence, there is a need for a mask that reduces the amount of gas used in a welding process. Additionally, it is desirable that the mask allow a repair area of the impeller to be entirely covered by the gas to reduce the likelihood that the filler material will become oxidized.

BRIEF SUMMARY

The present invention provides a mask for shielding a radially extending edge of an impeller vane during a weld repair process, where the impeller vane extends radially and axially outwardly from a shaft. The mask comprises a hub and a flange. The hub has an outer surface and an opening extending therethrough, and the opening is configured to allow the shaft to extend at least partially therethrough. The flange extends radially outwardly from the hub outer surface and is configured to shroud substantially all of the impeller vane radially extending edge.

In another embodiment, and by way of example only, the mask includes a hub and an annular flange. The hub has an outer surface and an opening extending therethrough, and the opening is configured to allow the shaft to extend at least partially therethrough. The annular flange extends radially outwardly from the hub outer surface and is configured to shroud substantially all of the impeller vane radially extending edges.

Other independent features and advantages of the preferred mask will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
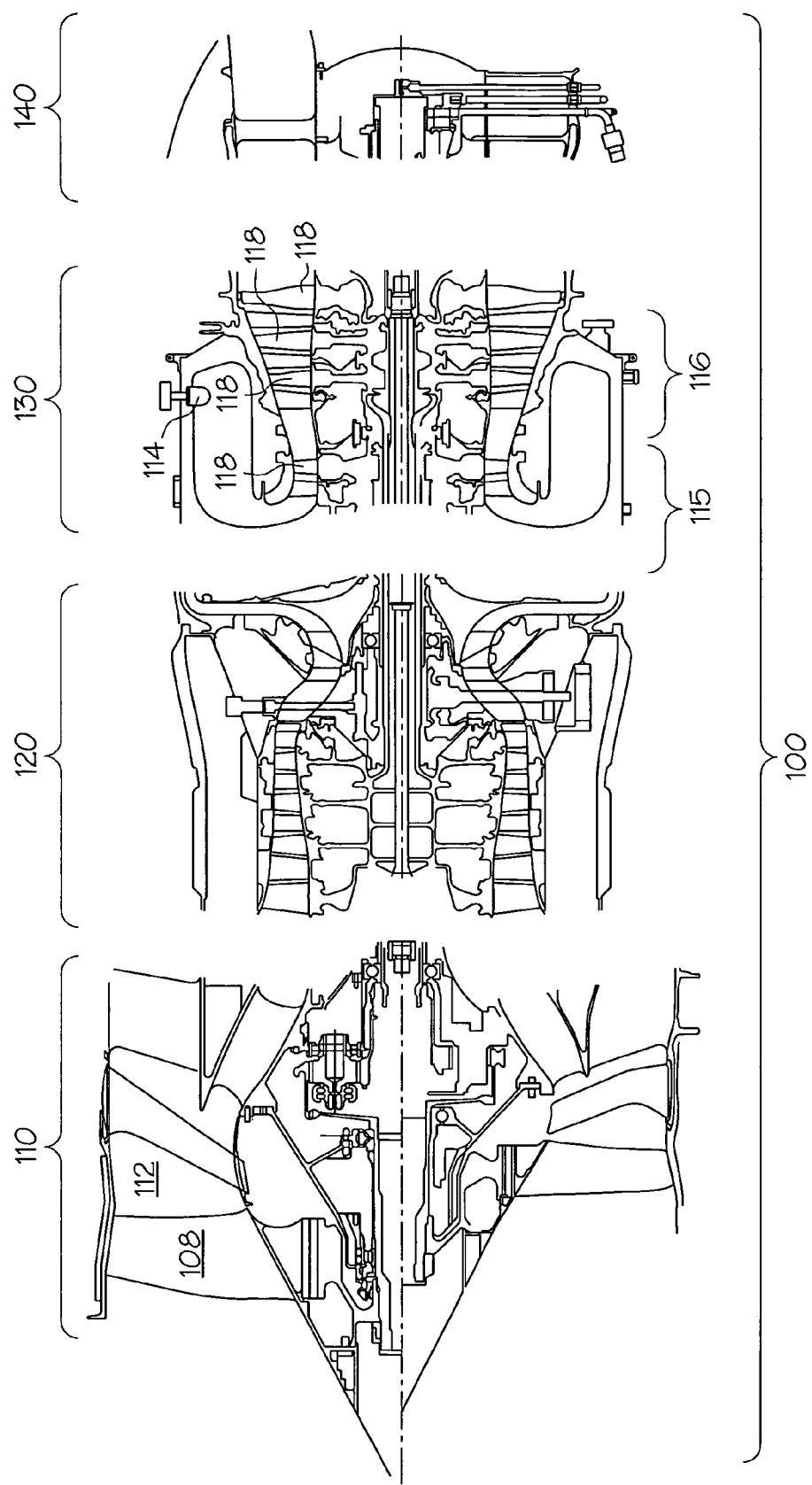
FIG. 1 is a partial cross section side view of a gas turbine engine with the major sections of the engine separated from one another.

Turning now to the description, and with reference first to FIG. 1, a partial cross section side view of a turbofan jet engine 100, on which the novel mask 270 may be used, is depicted. The turbofan jet engine 100 includes a fan module 110, a compressor module 120, a combustor and turbine module 130 and an exhaust module 140. The fan module 110 is positioned at the front, or "inlet" section of the engine 100, and includes a fan 108 that induces air from the surrounding environment into the engine 100. The fan module 110 accelerates a fraction of this air toward the compressor module 120, and the remaining fraction is accelerated into and through a bypass 112, and out the exhaust module 140. The compressor module 120 raises the pressure of the air it receives to a relatively high level.

The high-pressure compressed air then enters the combustor and turbine module 130, where a ring of fuel nozzles 114 (only one illustrated) injects a steady stream of fuel. The injected fuel is ignited by a burner (not shown), which significantly increases the energy of the high-pressure compressed air. This high-energy compressed air then flows first into a high pressure turbine 115 and then a low pressure turbine 116, causing rotationally mounted turbine blades 118 on each turbine 115, 116 to turn and generate energy. The energy generated in the turbines 115, 116 is used to power other portions of the engine 100, such as the fan module 110 and the compressor module 120. The air exiting the combustor and turbine module 130 then leaves the engine 100 via the exhaust module 140. The energy remaining in the exhaust air aids the thrust generated by the air flowing through the bypass 112.

Figure 2:
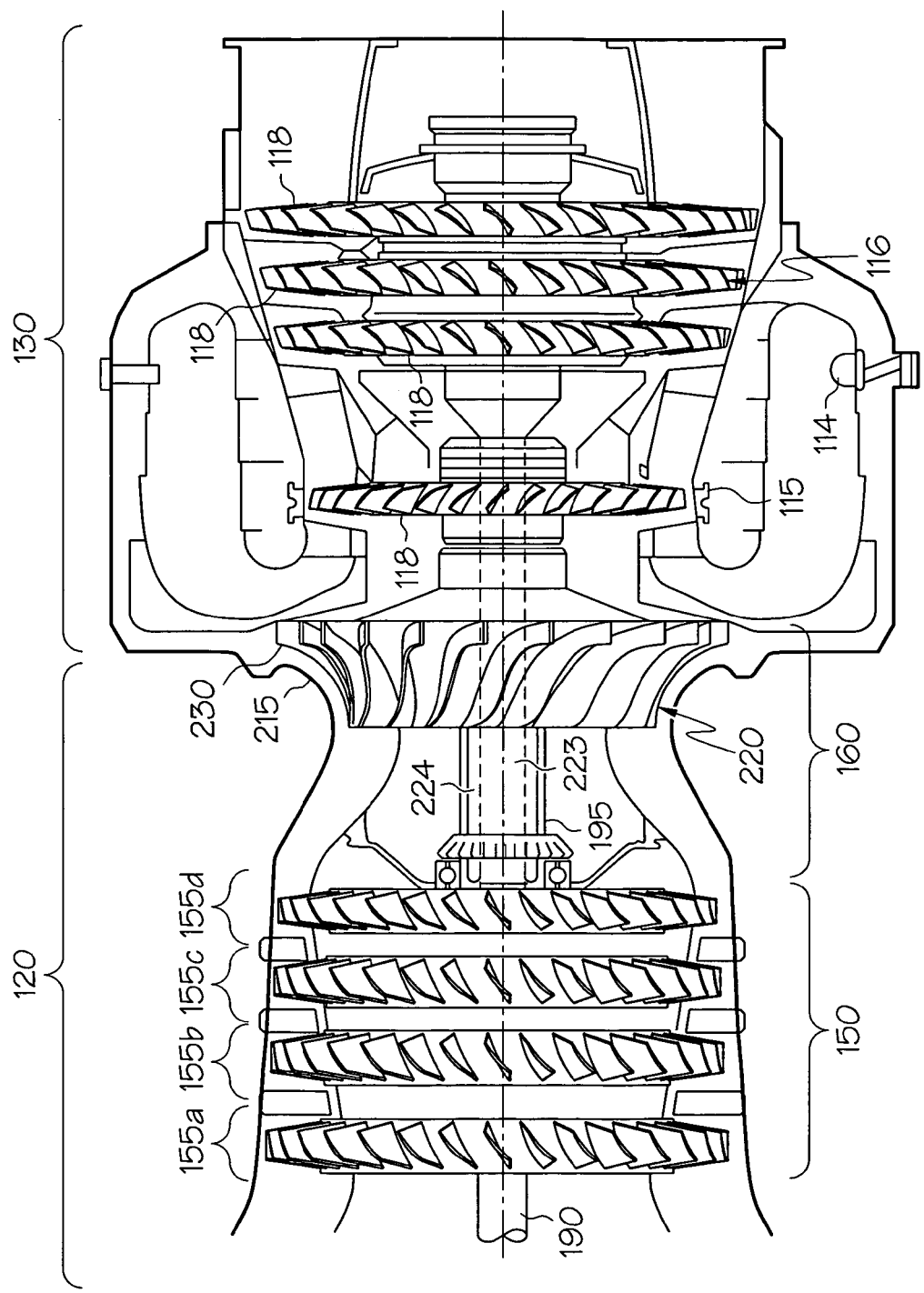
FIG. 2 is a close up cross section side view the compressor, combustor and turbine sections of a gas turbine engine depicted in FIG. 1.
Figure 3:
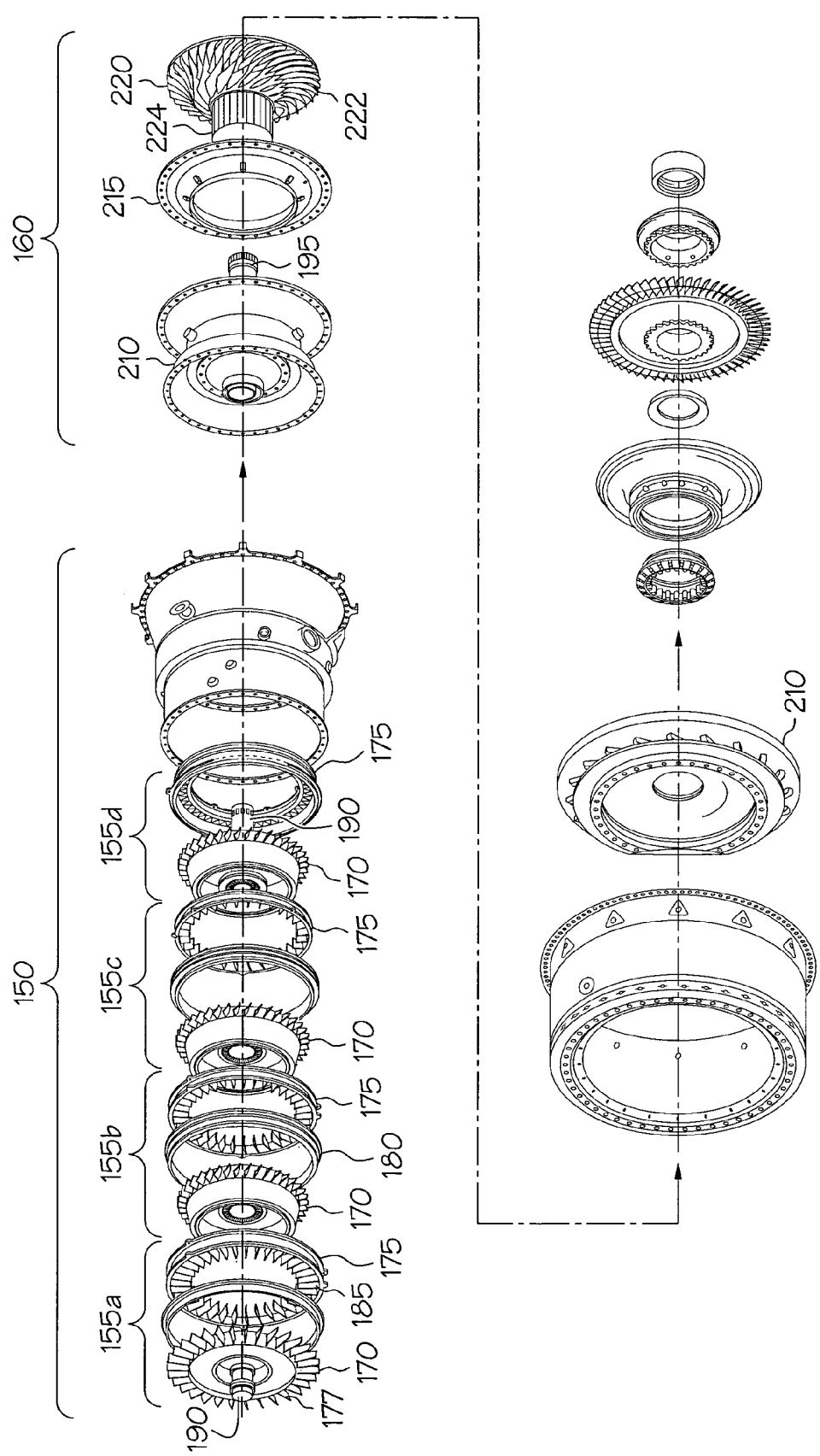
FIG. 3 is an exploded view of the compressor section depicted in FIG. 2.

With reference now to FIGS. 2 and 3, a more detailed description of the compressor module 120 will be provided. As shown, the compressor module 120 includes a low pressure section 150 and a high pressure section 160. The low pressure section 150 includes four stages 155a-d, each of which includes four rotors 170 and four stators 175. Each of the rotors 170 has a plurality of blades 177 and is surrounded by a shroud 180. As shown more clearly in FIGS. 2 and 3, each of the rotors 170 is rotationally mounted on a low pressure shaft 190, which is driven by the low pressure turbine 116. As the rotors 170 rotate, the blades 177 force air through each of the stators 175 in subsequent sections. Each stator 175 also includes a plurality of vanes 185. As the air from the rotors 170 travels across the vanes 185, it is forced to travel at a substantially optimum angle to the next stage, thereby increasing the air pressure as the air travels from stage to stage.

The high pressure section 160 includes a high pressure diffuser case 210, a shroud 215, and a high pressure impeller 220. The high pressure diffuser case 210 couples the low pressure section 150 to the high pressure section 160 and directs the air exhausted from the fourth stage 155d of the low pressure section 150 at an appropriate angle into the high pressure impeller 220. The shroud 215 is mounted to the diffuser case 210 and surrounds a portion of the high pressure impeller 220.

Figure 4:
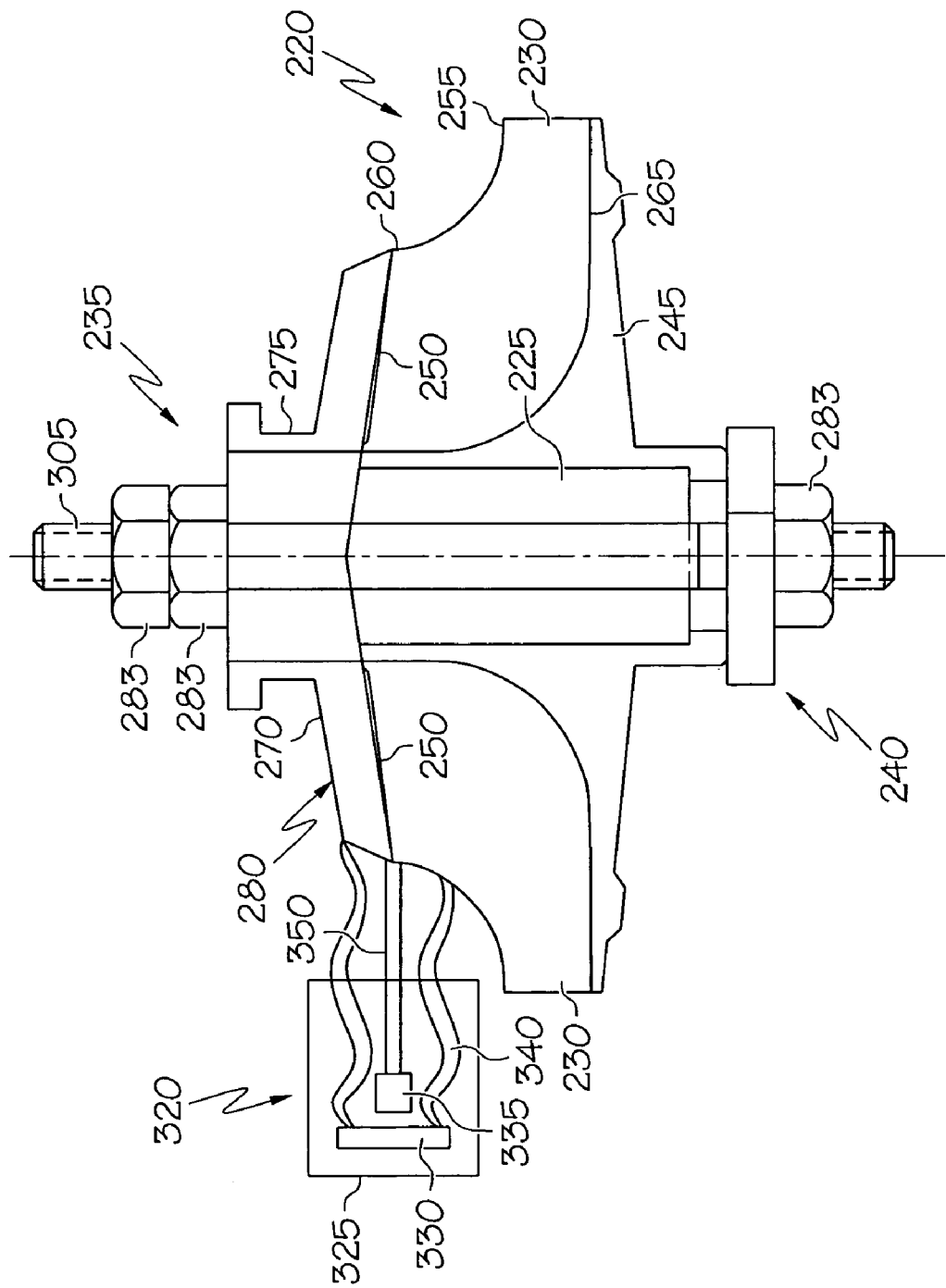
FIG. 4 is a cross section view of an exemplary impeller including an exemplary mask mounted thereto during a step in a welding process.

Turning now to FIG. 4, the impeller 220 is shown mounted to a shaft 225. The shaft 225 includes ends 235, 240 that are configured to couple the impeller 220 to the other sections of the engine 100. Additionally, the shaft 225 includes an annular disk 245 that extends radially outwardly from the shaft 225 and that may be integrally formed or coupled thereto. The impeller 220 includes a plurality of vanes 230 (also shown in FIG. 2) that are equally spaced apart around the shaft 225 and flare radially and axially outwardly therefrom as well. Each vane 230 includes a radially extending top edge 250, a side edge 255, and a corner 260 disposed therebetween. Additionally, the vane 230 includes a bottom edge 265 that may in some embodiments, such as the one shown in FIG. 4, be coupled to the disk 245. Also shown in FIG. 4, the side edge 255 has a curved portion and a straight portion, however, it will be appreciated that the side edge 255 may alternatively be entirely curved or entirely straight.

As mentioned briefly above, the impeller 220 may need to undergo a weld repair process. In such case, a mask 270, shown mounted on the impeller 220 in FIG. 4, is used. The mask 270 is configured to shield at least a portion of the impeller 220 and to maintain gases that are used to bathe the impeller 220 during a welding process in contact therewith.

Figure 5:
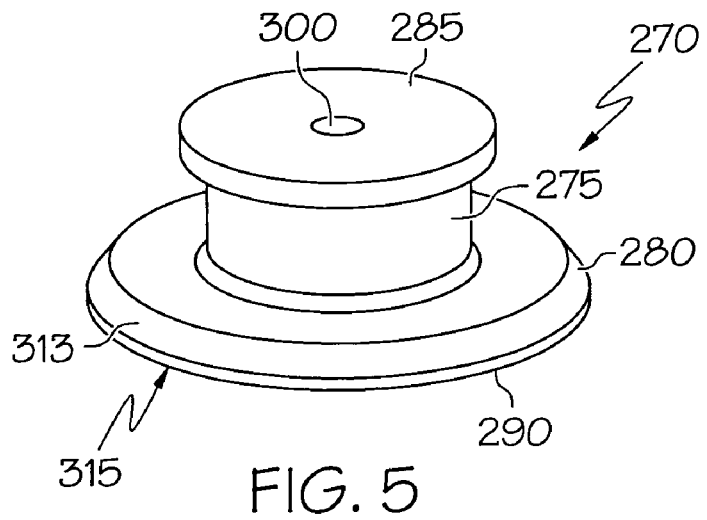
FIG. 5 is a perspective view of the exemplary mask shown in FIG. 4.
Figure 6:
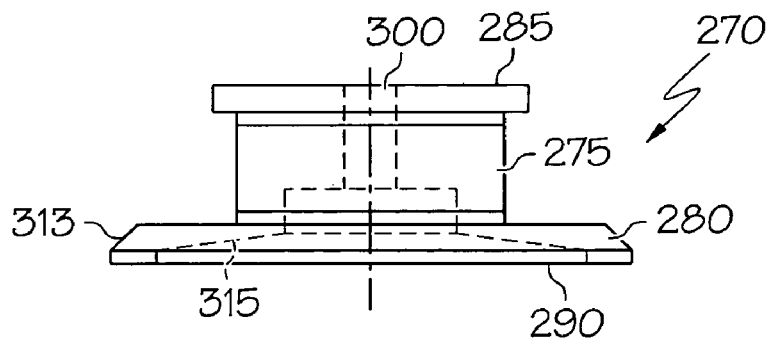
FIG. 6 is a cross section view of the exemplary mask shown in FIG. 5.

The mask 270 may be made of any one of numerous materials that can be shaped to seal against the impeller 220, such as, for example, aluminum, and includes a hub 275 and a flange 280. The hub 275 and flange 280 are shown in more detail in FIGS. 5 and 6. The hub 275 is generally cylindrical and includes two ends 285, 290 and an opening 300 that extends therebetween. The opening 300 is preferably configured to receive a fastener, for example, a threaded bolt 305 (shown in FIG. 4), for securing the mask 270 with nuts 283 between the shaft ends 235, 240 and may be partially or entirely threaded.

The flange 280 extends radially outwardly from one of the hub ends 290 and preferably extends substantially the length of the vane top edge 250. The flange 280 includes an outer peripheral surface 313 and a bottom surface 315. The outer peripheral surface 313 may have any one of numerous configurations and may be beveled. The bottom surface 315 is configured to shroud the impeller 220 by laying substantially flush against at least two top edges 250 of the vanes 230, as shown in FIG. 4. Although not shown, it will be appreciated that the flange 280, vanes 230, and disk 245 form a cup therebetween. In one exemplary embodiment, the flange bottom surface 315 is angled relative to the hub 275 and is formed to follow the contour of the vane top edge 250.

Figure 7:
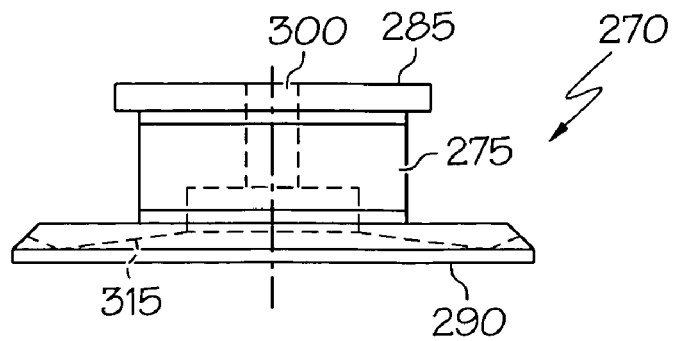
FIG. 7 is a cross section view of another exemplary mask.

In another exemplary embodiment, shown in FIG. 7, a portion of the flange bottom surface 315, particularly the outer periphery, is configured to angle away from the vane top edge 250 so that a gap is provided between the vane top edge 250 and the flange bottom surface 315. In this regard, when the mask 270 is mounted to the impeller 220, the gap allows the corner 260 to be substantially exposed. In another exemplary embodiment, the flange 280 extends along the length of the vane top edge 250 just short of the corner 260. Although shown in FIG. 5 as being substantially annular and laying substantially flush against each of the vane top edges 250, it will be appreciated that the flange 280 may be wedge-shaped or have any other suitable shape.

Returning to FIG. 4, during a weld process, a welding apparatus 320 is used that includes a shield cup 325, a gas supply source 330, and a heat source 335. The shield cup 325 partially directs gas 340 from the gas supply source 330 towards the impeller 220, which then pools into the cup formed by the mask 270, impeller vanes 230 and disk 245. Preferably, an amount of gas 345 sufficient to fill and spill out of the volume between the mask 270, impeller vanes 230 and disk 245 is dispensed thereto. After the impeller 220 is suitably bathed in gas, the heat source 335 supplies direct heat 350 to a selected portion of the impeller 220, such as, for example, the vane corner 260. The heat source 335 may be any source of concentrated energy, such as a laser generator.

The above-described mask 270 reduces the amount of noble gas used in a welding process and allows the impeller 220 to be substantially bathed in gas. Consequently, the likelihood of the filler material becoming oxidized is decreased. As a result, the repaired impeller 270 is structurally robust, and frequency of repair is decreased.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A mask for shielding a radially extending edge of an impeller vane during a weld repair process, the impeller vane extending radially and axially outwardly from a shaft, the mask comprising:
    a hub having an outer surface and an opening extending therethrough, the opening configured to allow the shaft to extend at least partially therethrough; and
    a flange extending radially outwardly from the hub outer surface and configured to shroud substantially all of the impeller vane radially extending edge.

2. The mask of claim 1, wherein the hub includes an inner surface having a threaded section configured to provide threaded engagement with a threaded bolt.

3. The mask of claim 1, wherein:
    a plurality of impeller vanes extend radially and axially outwardly from the shaft and each vane has a radially extending edge; and
    the flange is an annular flange configured to substantially shroud the radially extending edges of the plurality of impeller vanes.

4. The mask of claim 3, wherein the annular flange has a beveled outer peripheral edge.

5. The mask of claim 1, wherein the flange includes a vane contact surface and at least a portion of the vane contact surface is configured to lay flush against the radially extending edge.

6. The mask of claim 5, wherein an outer peripheral portion of the vane contact surface is configured to angle away from the radially extending edge and to form a gap therebetween, when the mask is mounted to the impeller.

7. The mask of claim 5, wherein the radially extending edge has a length and the vane contact surface has a length that is less than the length of the radially extending edge.

8. The mask of claim 1, wherein the hub is a cylinder.

9. The mask of claim 1, wherein the hub and flange comprise a metal.

10. A mask for shielding radially extending edges of a plurality of impeller vanes during a weld repair process, the impeller vanes each extending radially and axially outwardly from a shaft, the apparatus comprising:
    a hub having an outer surface and an opening extending therethrough, the opening configured to allow the shaft to extend at least partially therethrough; and
    an annular flange extending radially outwardly from the hub outer surface and configured to shroud substantially all of the impeller vane radially extending edges.

11. The mask of claim 10, wherein the annular flange includes a vane contact surface and at least a portion thereof is configured to lay flush against at least one of the radially extending edges.

12. The mask of claim 11, wherein an outer peripheral portion of the vane contact surface is configured to angle away from the radially extending edge when the mask is mounted to the shaft.

13. The mask of claim 12, wherein a gap is formed between the outer peripheral portion of the vane contact surface and the radially extending edge.

14. The mask of claim 11, wherein the radially extending edge has a length and the vane contact surface has a length that is less than the length of the radially extending edge.

15. The mask of claim 10, wherein the hub is a cylinder.

16. The mask of claim 10, wherein the hub and annular flange comprise a metal.

17. The mask of claim 10, wherein the hub includes a threaded inner surface configured to provide threaded engagement with a threaded bolt.

* * * * *